US006847815B1

(12) United States Patent
Graf et al.

(10) Patent No.: US 6,847,815 B1
(45) Date of Patent: Jan. 25, 2005

(54) METHOD FOR DETECTING, ON A TELECOMMUNICATION NETWORK SIDE, THE COMPLEXITY, ON THE TELECOMMUNICATION NETWORK SIDE, OF A TELECOMMUNICATION LINK BETWEEN TWO SUBSCRIBERS IN ORDER TO DETERMINE THE RATE, AND DEVICE FOR REALISING THE SAME

(75) Inventors: Florian Graf, Düsseldorf (DE); Peter Kempa, Willich (DE); Oliver Mauss, Ratingen (DE); Eckhard Siebe, Meerbusch (DE); Thorsten Werther, Düsseldorf (DE)

(73) Assignee: Mannesmann AG, Düsseldorf (DE)

( * ) Notice: Subject to any disclaimer, the term of this patent is extended or adjusted under 35 U.S.C. 154(b) by 0 days.

(21) Appl. No.: 09/743,725

(22) Filed: Apr. 30, 2001

(30) Foreign Application Priority Data

Jul. 14, 1998 (DE) .......................................... 198 32 713
Nov. 4, 1998 (DE) .......................................... 198 52 197

(51) Int. Cl.[7] .............................................. H04M 11/00
(52) U.S. Cl. ....................... 455/406; 455/407; 455/408; 455/456.1
(58) Field of Search ................................ 455/406, 407, 455/408, 456.1

(56) References Cited

U.S. PATENT DOCUMENTS 5,524,182 A * 6/1996 Chari et al. ................ 358/1.11
5,960,341 A * 9/1999 LeBlanc et al. ......... 455/426.1
6,018,652 A * 1/2000 Frager et al. ............... 455/406

(List continued on next page.)

FOREIGN PATENT DOCUMENTS

| EP | 462726 A2 | * 12/1991 | .......... H04B/7/26 |
| WO | WO 9428670 A1 | * 12/1994 | .......... H04M/15/16 |

OTHER PUBLICATIONS

Stochastic Geometry: A Tool for Modeling of Telecommunication Networks, http://www.di.ens.fr/~mistral/sg/, printed on May 14, 2004.

Geometry in Action, Voronoi Diagrams, http://www.ics.uci.edu/~eppstein/gina/voronoi.html.

*Primary Examiner*—Quochien B. Vuong
*Assistant Examiner*—Duy Le
(74) *Attorney, Agent, or Firm*—Cohen, Pontani, Lieberman & Pavane (57) ABSTRACT

An optimized detection of the complexity at the telecommunication network end for the purpose of charging is made possible by a telecommunication network and a method for detecting, at the telecommunication network end, the complexity, at the telecommunication network end, with respect to a desired or existing telecommunication connection between two subscribers for the purpose of charging, in which a subscriber is a mobile radio subscriber with a mobile radio and the other subscriber is a line network subscriber with a line network connection, in which the position of the mobile radio subscriber is detected, in which, in the case of a telecommunication connection of the mobile radio subscriber to a line network subscriber, whose line network connection, due to the line network connection dialing code, is located within a predeterminable local area surrounding the position of the mobile radio subscriber, a local call is detected, whereas, in the case of a telecommunication connection of the mobile radio subscriber to a line network subscriber, whose line network connection, due to its line network connection dialing code, is located outside the predeterminable local area surrounding the position of the mobile radio subscriber, a long-distance call is detected which is expensive compared with the local call.

22 Claims, 8 Drawing Sheets

U.S. PATENT DOCUMENTS 6,205,326 B1 * 3/2001 Tell et al. .................... 455/406
6,212,387 B1 * 4/2001 McLaughlin et al. ....... 455/450
6,226,367 B1 * 5/2001 Smith et al. ........... 379/142.04
6,324,404 B1 * 11/2001 Dennison et al. ......... 455/456.1
6,347,224 B1 * 2/2002 Smyth et al. ............... 455/406
6,522,877 B1 * 2/2003 Lietsalmi et al. ......... 455/422.1

* cited by examiner

Table in SMP und SCP:

| Locationnumber | NDC1 | NDC2 | NDC3 | NDC4 |
|---|---|---|---|---|
| LN(1) | 0211* | 0212* | 02173* | 02174* |
| | 030* | | | |
| ... | | | | |
| LN(n) | | | | |

Number of Cells  n >10.000

| | | | |
|---|---|---|---|
| G1 | VW1 | #populated | #unpopulated |
| G1 | VW3 | #populated | #unpopulated |
| G1 | VW4 | #populated | #unpopulated |
| G1 | VW7 | #populated | #unpopulated |
| G2 | VW1 | #populated | #unpopulated |
| G2 | VW2 | #populated | #unpopulated |
| G2 | VW4 | #populated | #unpopulated |
| G2 | VW5 | #populated | #unpopulated |
| G2 | VW7 | #populated | #unpopulated |
| G2 | VW8 | #populated | #unpopulated |
| G3 | VW3 | #populated | #unpopulated |
| G3 | VW6 | #populated | #unpopulated |
| G3 | VW7 | #populated | #unpopulated |
| G3 | VW9 | #populated | #unpopulated |

Fig. 8

Local area of radio cell 61 (in Fig. 6):

| | | | |
|---|---|---|---|
| G1 | VW4 | #populated | #unpopulated |
| G1 | VW7 | #populated | #unpopulated |
| G2 | VW7 | #populated | #unpopulated |
| G3 | VW7 | #populated | #unpopulated |
| G3 | VW8 | #populated | #unpopulated |

Fig.9

METHOD FOR DETECTING, ON A TELECOMMUNICATION NETWORK SIDE, THE COMPLEXITY, ON THE TELECOMMUNICATION NETWORK SIDE, OF A TELECOMMUNICATION LINK BETWEEN TWO SUBSCRIBERS IN ORDER TO DETERMINE THE RATE, AND DEVICE FOR REALISING THE SAME

PRIORITY CLAIM

This is a U.S. national stage of application No. PCT/DE99/01506, filed on May 14, 1999. Priority is claimed on that application and on the following application: Country: Germany, Application No.: 198 32 713.7, Filed: Jul. 14, 1998.

BACKGROUND OF THE INVENTION

1. Field of the Invention

The invention relates to a method for detecting, at the telecommunication network end, the complexity, at the telecommunication network end, with respect to a telecommunication connection between two subscribers for the purpose of charging, and device for carrying out the method.

2. Discussion of the Prior Art

Methods for detecting, at the telecommunication network end, the complexity, at the telecommunication network end, with respect to a telecommunication connection between two subscribers for the purpose of charging, are known in the line network area where different charges are in each case calculated for local calls and long-distance calls over different distances.

SUMMARY OF THE INVENTION

The object of the present invention is to detect the complexity, at the telecommunication network end, with respect to a telecommunication connection between a mobile radio subscriber and a line network subscriber with respect to the required trunk line capacities for providing for appropriate charging.

According to the invention, by detecting the position of the mobile radio subscriber and correlating data relating to this position with a location area predetermined for this position in a table, one or more local areas can be defined which de facto travel along with the position of the mobile radio telephone, surrounding the latter. Since, during a telecommunication connection of a mobile radio subscriber with a line network subscriber located in its vicinity, no telecommunication trunk lines are required, the detection of such a constellation according to the invention allows complexity-related charging. This is of significance since, for example, in a long-distance call by a mobile radio subscriber with a current position in Munich to a line network subscriber with a current position in Hamburg, a much higher complexity arises at the telecommunication network end due to the required telecommunication trunk line from Munich to Hamburg, than, for example, in the case of a call of a mobile radio subscriber with a current position in Hamburg to a line network subscriber in Hamburg. In this context, the mobile radio subscriber can be the caller and the line network subscriber the called party. The complexity to be detected in the sense of the invention is thus, in particular, whether a telephone line is required or not required out of a local area and whether network switching centers (MSCs, GMSCs etc.) are required or not required.

In the case of the detection of a local call, the caller is preferably informed about this. For this purpose he can either be connected to a voice announcement system or a short message can be sent to the caller by a short message system.

A long-distance call in the sense of the application can be any call which does not go into the local area surrounding the position of the mobile radio subscriber. Thus, a long-distance call can be a long-distance call into different tariff zones of the line network area or an international call. The telecommunication connection according to the invention is, in particular, a voice or fax connection.

The detection of whether a line network connection is within a predeterminable local area surrounding the position of the mobile radio subscriber is suitably carried out in components of the telecommunication network. A table of mobile radio subscriber position local areas and respective associated line network dialing codes is suitable for this purpose. Mobile radio subscriber position local areas can be stored, for example, in each case with reference to mobile radio network elements, in particular mobile radio base stations or radio cells. The position of a mobile radio subscriber can be detected, for example, on the basis of the radio cell or of the base station via which he is communicating, and allocated to a mobile radio subscriber local area. The determination as to whether the dialing code of the line network subscriber is within the local area defined by the table with respect to the detected position of the mobile radio subscriber can be detected by comparing the line network subscriber dialing code with all dialing codes in the table to the base station, radio cell etc. in which the mobile radio subscriber is currently located.

In principle, the detection of whether the call present is a local call or a long-distance call is possible both in a mobile radio telecommunication network and in a line network telecommunication network.

With respect to the device, the invention can be implemented in a telecommunication network having connections to a mobile radio telecommunication network and to a line network telecommunication network, and detection means for detecting complexity, at a telecommunications network end, with respect to a telecommunication connection between a mobile radio subscriber and a line network subscriber for purposes of charging. The detection means includes a subscriber detection device for establishing whether one subscriber is a mobile radio subscriber and whether another subscriber is a line network subscriber. The detection means further includes a position detection device for detecting a current position of the mobile radio subscriber. The detection still further includes a location area detection device operatively arranged so that in case of a telecommunication connection between a mobile radio subscriber and a line network subscriber, a line network connection of which, due to a line network connection dialing code, is located within a predeterminable local area surrounding the position of the mobile radio subscriber, a local call is detected, whereas, in case of a telecommunication connection with a line network subscriber whose line network connection is located outside the predeterminable local area surrounding the position of the mobile radio subscriber due to the line network connection dialing code, a long-distance call is detected which is expensive compared with the local call.

BRIEF DESCRIPTION OF THE DRAWINGS

Other features and advantages of the invention are found in the subsequent description of an exemplary embodiment, referring to the drawing, in which.

DETAILED DESCRIPTION OF THE PREFERRED EMBODIMENTS

Figure 1:
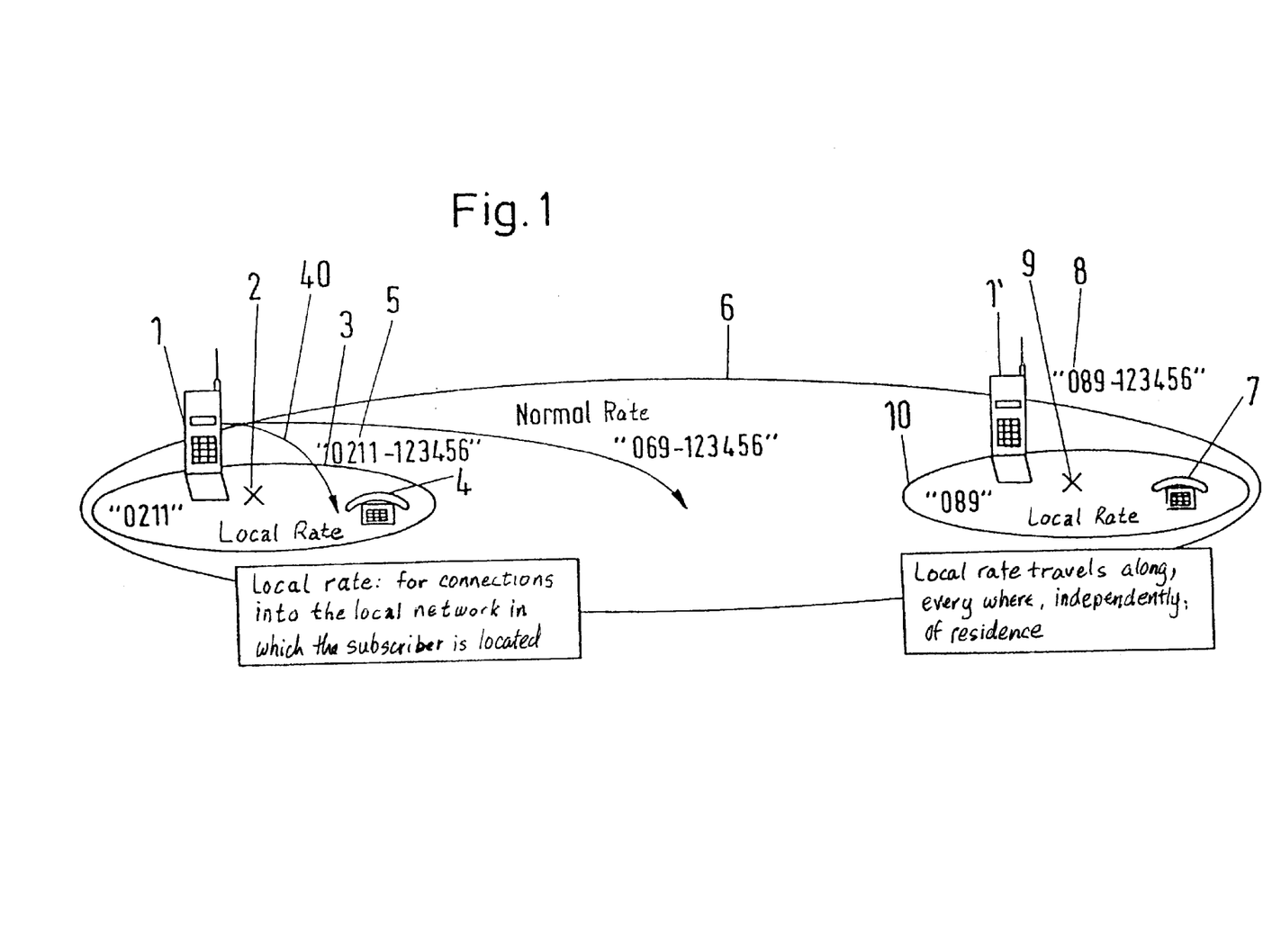
FIG. 1 diagrammatically shows two mobile telephones and local areas surrounding them, FIG. 2 diagrammatically shows processes at the telecommunication network end when a subscriber is informed about the presence of a local call or a long-distance call.

FIG. 1 shows a mobile radio subscriber 1 in the form of a mobile radio telephone at a position 2, in which arrangement a local call is detected and charged in a predetermined local area 3, surrounding the position 2, for local calls between the mobile radio subscriber 1 with the position 2 and a line network subscriber 4 with a dialing code 5 (with the number sequence 0211), whereas, due to the trunk line 6 for the long-distance call, a higher complexity is detected and a long-distance call is charged for a telecommunication connection 6 between the mobile radio subscriber 1 and a line network subscriber 7 having the dialing code 8 (number sequence 089). Thus, the mobile radio subscriber 1 can conduct local calls in a local area 3 surrounding the position and traveling along with his current mobile radio subscriber position 2, and can conduct long-distance calls with line network subscribers outside this area.

If the mobile radio subscriber 1 is located at the position 9, shown on the right of mobile radio subscriber 1' in FIG. 1, instead of the position 2 shown on the left in FIG. 1, his local area is the local area 10 surrounding the current position 9.

Figure 2:
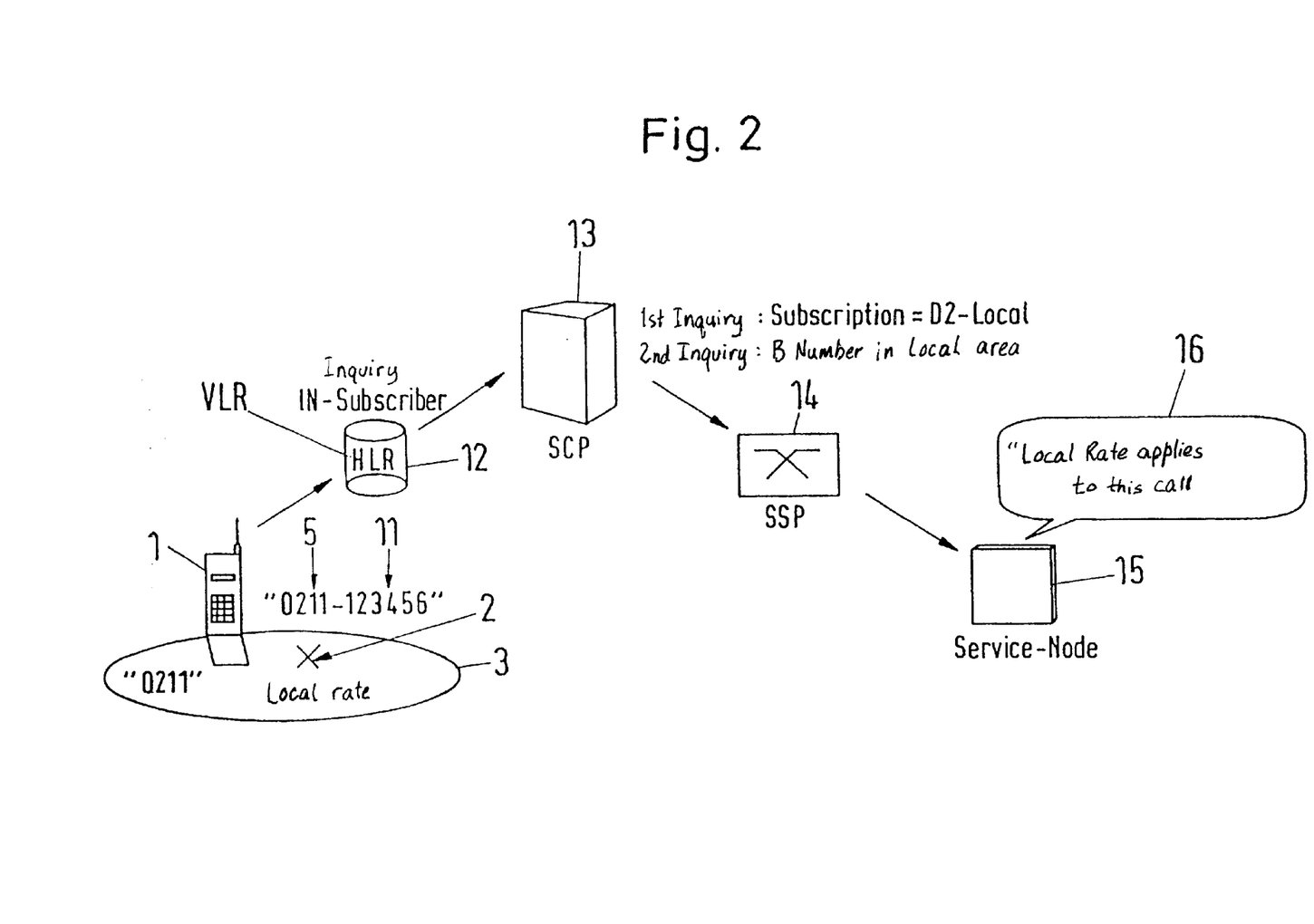

FIG. 2 also shows the mobile radio subscriber 1 with the local area 3 surrounding him, in which (as in FIG. 1) only a dialing code 5 (namely the number sequence 0211) can be dialed as a local call (at local rate) whereas only long-distance calls can be conducted outside the local area 3 around the current mobile radio subscriber position 2. If the mobile radio subscriber 1 calls a telephone number 5, 11 (number sequence 0211-123456), an inquiry 12 by the mobile radio subscriber 1 (who is a subscriber of the intelligent telecommunication network according to the invention) is forwarded to a service control point (SCP) 13. SCP 13 transmits to a service switching point (SSP) 14 an inquiry as to whether the mobile radio subscriber 1 is authorized for telephoning at a cheaper rate (local calls) in the local area surrounding its position than normal calls (=long-distance calls), i.e. as to whether he has subscribed to this service, for example, and an inquiry as to whether the telephone number 5, 11 (number sequence 0211-123456) called by the mobile radio subscriber 1 is located in the local area around the current position 2 of the mobile radio subscriber. In the service node 15, it is established on the basis of a table with reference to the position 2 of the mobile radio subscriber 1 whether the dialed dialing code 5 (number sequence 0211 here) is located in the local area around the position 2 or not. For this purpose, the position 2 of the mobile radio subscriber 1 can be transmitted in particular in the form of a representation representing elements of the mobile radio telecommunication network, especially in the form of the designation of a radio cell, a base station, a location number etc. The service node 15 here establishes that the called dialing code 5 (number sequence 0211) is within the local area 3 around the position 2 of the mobile radio subscriber 1. For this reason, the message 16 "local rate applies to this call" (=local call) is here generated in the service node 15. This message 16 can be communicated to the mobile radio subscriber 1 in different ways. For example, a full-rate telephone connection (to distinguish it from a short message, i.e. a full-rate, half-rate etc. connection) can be established between the mobile radio subscriber 1 and the service node 15 and the message 16 can be transmitted to the mobile radio subscriber 1 as a voice message. It is also possible to transmit the message 16 from the service node 15 to the subscriber 1 by short message (for example GMS-SMS or USSD). As a result, the mobile radio subscriber 1 can be reliably informed as to the complexity produced by his call at the telecommunication network end, that is to say as to whether he is charged for a local call or a long-distance call for the telecommunication connection.

Figure 3:
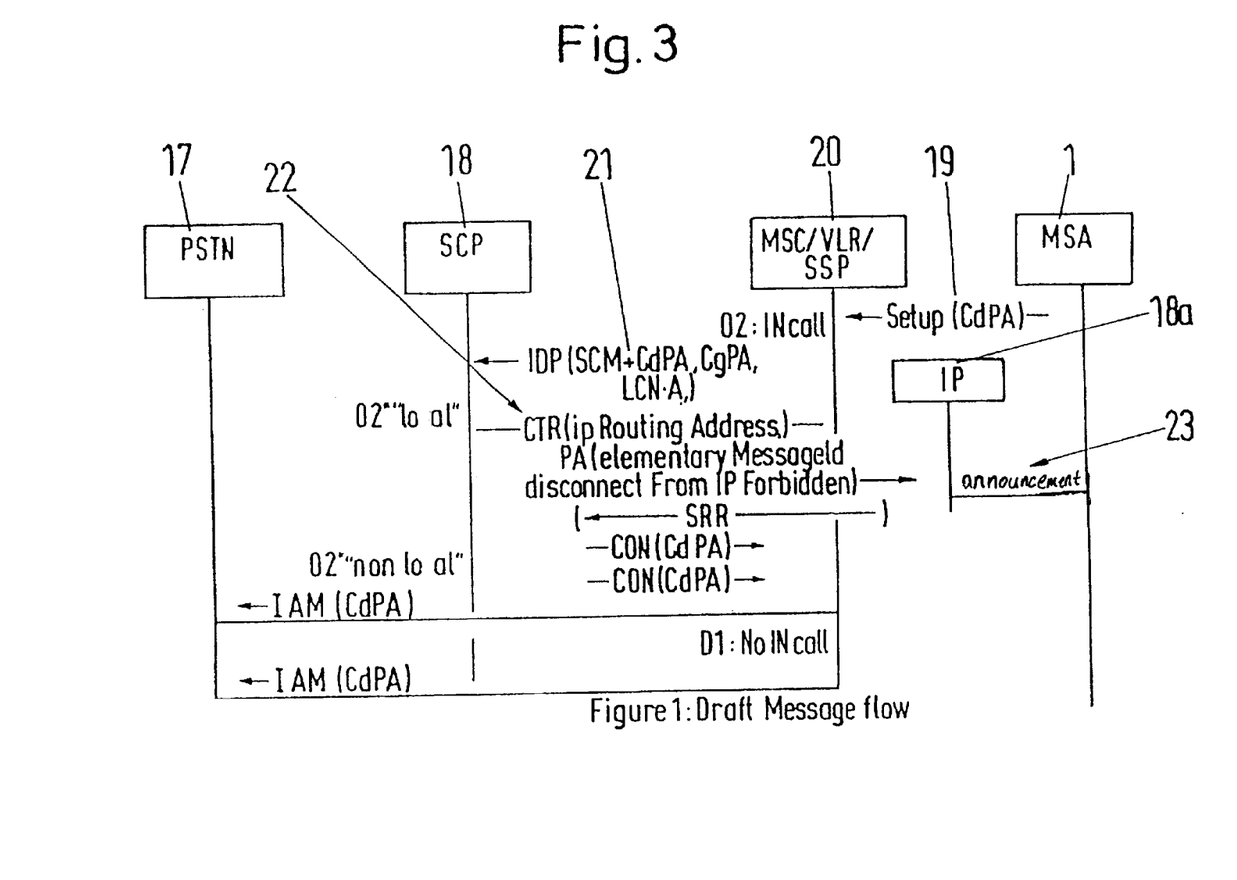
FIG. 3 shows significant parts of the signal flow.

FIG. 3 shows essential parts of the signaling between a public telephone network PSTN, that is to say a line network 17, a service control point SCP 18, a group 20 of mobile radio network elements (MSC=mobile switching center, VLR=visitor location register, SSP=service switching point), an intelligent peripheral 18a (IP=intelligent peripheral, e.g. in the service node 15) and an MS-A 1 (mobile radio subscriber 1). In particular, FIG. 3 shows set-up signaling 19 from the mobile radio subscriber 1 to the mobile radio network elements 20, the inquiry 21 of the elements 20 at the SCP 18 as to whether this is a local call, the answer 22 of the SCP 18 to the intelligent peripheral 18a as to whether this is a local call, the short message 23 of the intelligent peripheral 18a to the mobile station MS-A (=1) and the standard CON message (CDPA). In the case where this is not a local call (non-local), the CON message (CdPA) is also transmitted. FIG. 3 also shows the standard IAM messages (CdPA).

Figure 4:
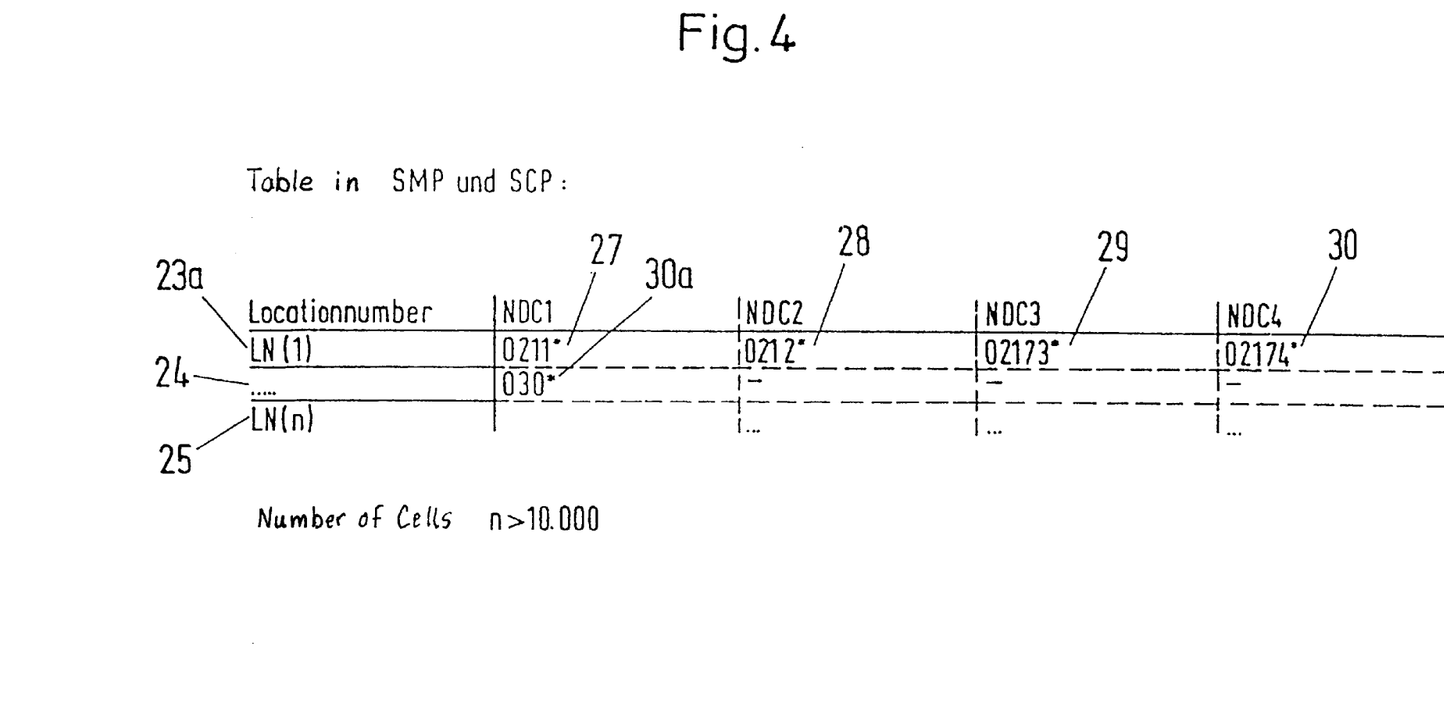
FIG. 4 shows, by way of example, an excerpt from a table with radio cells (location number) and local area dialing code numbers allocated to a radio cell, FIG. 5 diagrammatically shows some radio cells and location dialing zones which are in each case applicable to the radio cells.

FIG. 4 illustrates the detection of whether this is a local call or long-distance call, by means of a table with location numbers 23a to 25 representing possible positions 2 and local area dialing codes 0211 (26), 0212 (27), 02173 (28), 02174 (29) in each case allocated to these location numbers. For the example of location number 24, for example, only one dialing code 030 (30) is specified here which is the only one to which local calls can be conducted. Location number 23a to 25 can represent, in particular, a radio cell, a base station, a group of radio cells, a group of base stations etc. For example, a location number can represent all radio cells or base stations within one city. In addition, a location number can represent the area which contains the current position 2 of the mobile radio subscriber 1 and represents the boundaries of a location area of a line network provider. The table according to FIG. 4 can be generated in different ways. It is advantageous for generating the table if a file in which dialing codes and local areas are specified with respect to one another by a line network operator with which the mobile communication network operator regularly establishes connections is available. Cell areas are allocated to dialing code areas indirectly via, on the one hand, the allocation of cell areas to location numbers and, on the other hand, via the allocation of location numbers to dialing code areas. In particular, an attribute to a dialing code which specifies whether the dialing code area is ("populated" or "not populated") is advantageous. In particular, the number of digits of the dialing code can be taken into consideration for generating a local area. A certain number of the first digits of the dialing code can be taken into consideration. The number of significant digits can be configured in dependence on dialing code.

The position of a mobile radio subscriber can be detected, in particular with respect to radio cells of the mobile radio network, and stored. For example, a position 2 can be specified in the form of the radio cell in which it is located. To define the local area which is specified by a radio cell, for example, a polygonal course defining the radio cell can be determined which, for example, is formed by the center perpendiculars of the connecting lines of base stations which are in each case spatially adjacent to the radio cell. If necessary, a displacement in the direction of the main beam direction can be performed in the direction of the main beam direction of the transmitter of the polygonal course of the radio cell to be defined, for example only a few meters or one second etc. Following this, the possible positions are available in the form of polygonal areas which in each case represent one radio cell.

In order to be able to compare a position of a mobile radio subscriber (in the form of the radio cell via which it is currently telephoning) and a dialing code area called by the mobile radio subscriber, a list of dialing codes 27 to 30 which can be obtained as local area by each radio cell is generated for each radio cell (location number in FIG. 4).

The dialing code areas are suitably allocated on the basis of a file of a line network operator, in which file all area elements contained in the dialing code area are in each case specified geographically for a dialing code number. The assessment can be done in a grid dimension of 25×25 m. If area elements are characterized in the file of the line network operator with respect to whether they are populated or not populated, it is suitable to consider only the "populated" area elements since a significant number of calls with a line network subscriber can be expected only in these.

The dialing code areas 27, 28, 29, 30 allocated to a location number 23*a* can be selected, in particular, on the basis of the following criteria, considering in each case the polygonal area of a radio cell (with a location number):

a) If the polygonal area considered of the radio cell considered (with location number 25) is not in a dialing code area, i.e. if the polygonal area does not cover a single area element having the attribute "populated", this polygonal area is allocated to the dialing code area in which the associated location number is located (in this case, the attributes "populated" or "not populated" are not taken into consideration).

b) If the polygonal area considered is only located in a single dialing code area 30, i.e. if this polygonal area only covers populated area elements of a single dialing code area, this is the only one which is allocated a dialing code area.

c) If the polygonal area considered is located in two dialing code areas, i.e. if this polygonal area only covers populated area elements of two dialing code areas, these two dialing code areas are allocated.

d) If the polygonal area considered is located in three dialing code areas, i.e. if this polygonal area only covers populated area elements of three dialing code areas, these three dialing code areas are allocated.

e) If the polygonal area considered is located in four dialing code areas, i.e. if this polygonal area only covers populated area elements of four dialing code areas, these four dialing code areas are allocated.

f) If the polygonal area considered is located in more than four dialing code areas, i.e. if this polygonal area covers populated area elements of more than four dialing code areas, the four dialing code areas which cover absolutely most of the populated area elements are allocated.

Figure 5:
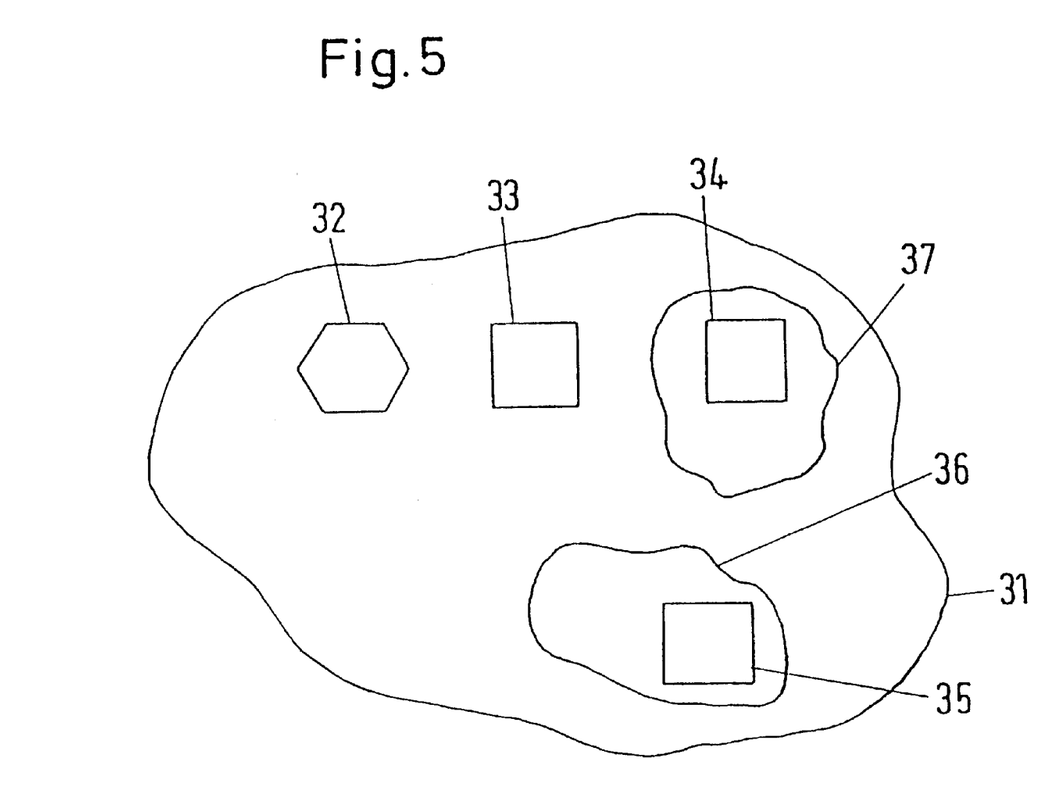

FIG. 5 shows, in a section 31 of a telecommunication network, a number of radio cells 32, 33, 34, 35 with a form shown polygonally for the purpose of simplification.

The radio cell 35 contains, for example, only a sub-area of the city of Düsseldorf 36 (with the dialing code 0211) within the entire range of coverage of the radio cell 35. Thus, it is possible to telephone to the dialing code area of the city of Düsseldorf 36 (0211) in the local area, but not to sub-areas of the city of Münster (37), within the radio cell 35.

FIGS. 6 to 9 show an exemplary embodiment for the allocation of dialing code clusters (=groups of dialing codes) to communities and of communities to radio cells. In principle, when a caller 1 calls a called party 7, a local call is detected and charged if the dialing code of the called party 7 is contained in a dialing code cluster which is allocated to one of the communities in which the radio cell is radiating in which the calling telecommunication subscriber 1 is currently registered (in the manner usual for mobile radio systems).

Figure 6:
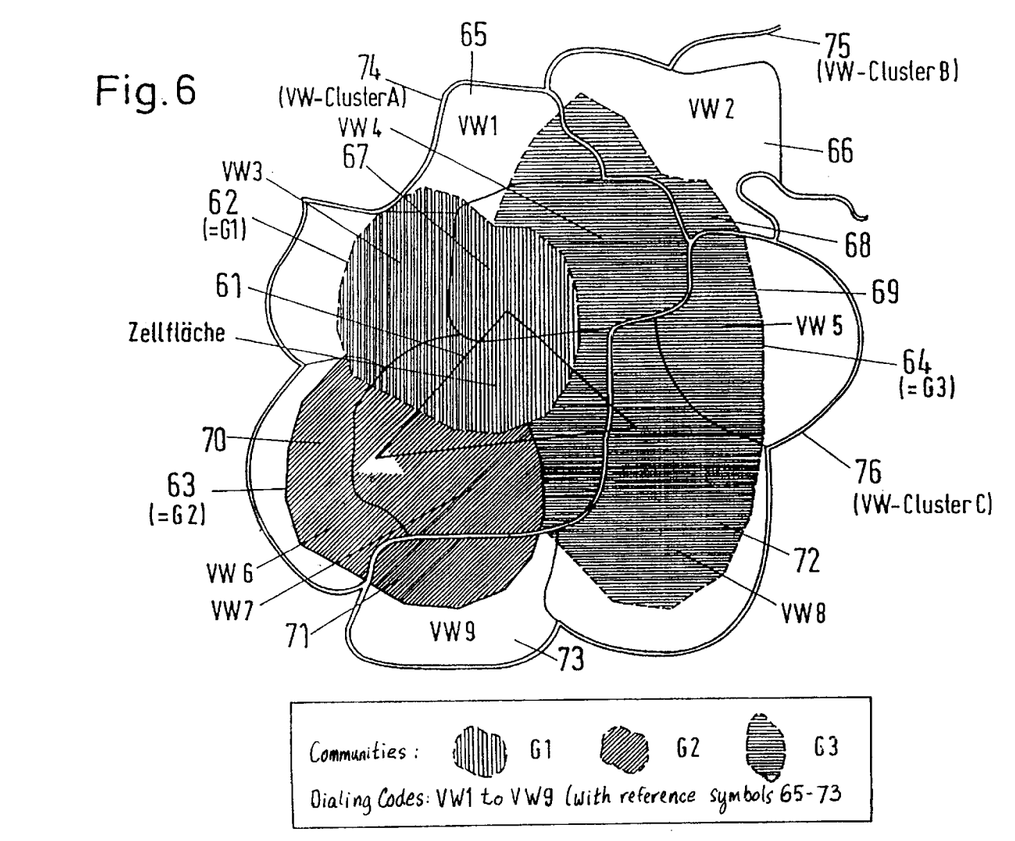
FIG. 6 shows a section of a mobile radio network.

FIG. 6 shows by way of example a small section of a mobile radio network, for example a GSM mobile radio network. In this section, a number of radio cells are allocated to a base station 60. The cell area (=radio cell area) 61 covered by one of these radio cells is shown as a triangle; within this triangle 61 shown, a reception of transmissions radiated for this radio cell 61 should be possible for mobile stations.

FIG. 6 also shows communities which are depicted shaded, the first community, designated as G1 in the subsequent tables, here bearing the reference symbol 62, the community G2 bearing the reference symbol 63 and the community G3 bearing the reference symbol 64. The spatial areas covered by communities can either correspond to individual dialing codes or to dialing code clusters (=a number of different dialing codes). Individual dialing codes can also be allocated to a number of communities. FIG. 6 shows by way of example the dialing codes VW1 to VW9 with the reference symbols 65 to 73. Furthermore, three dialing code clusters, namely the dialing code cluster A (reference symbol 74), dialing code cluster B (reference symbol 65) and dialing code cluster C (reference symbol 76) are shown. For the purpose of simplification, boundary lines of different line thicknesses were used for the dialing code areas (VW1 to VW9 with reference symbols 65 to 73), the communities G1, G2, G3 (with reference symbols 62 to 64) and the dialing code clusters A, B, C (reference symbols 74 to 76), namely a thicker line thickness of the dialing code clusters (in each case comprising one or a number of dialing codes), a continuous thinner line thickness for the dialing code areas (or the thick line thickness of the dialing code clusters where the dialing code area boundaries are also dialing code class boundaries) and a thin line thickness in dashed form for the communities. In addition, the three communities were shown shaded. To then find out whether a local call can be conducted from the current radio cell (with radio cell area 61, triangular FIG. 6) to a subscriber in one of dialing code areas VW1 to VW9 (reference symbols 65 to 73), the following procedure is adopted:

The following available base data are used as a basis:

community information relating to the geographic area of the community, the community name and a community code, local network information relating to the geographic areas of the local networks, local network names and local network dialing codes, population data relating to geographic pixel information on populated and unpopulated regions, coordinates of base stations, main radiating directions of radio cells (=azimuth) and possibly the type of cell which can depend, for example, on whether the cell is in the country or in the city (for example a picocell), whether the cell has the form of a lobe etc.

In preparation, first the information available for communities, relating to their geographic areas with the local network information relating to geographic areas of the local networks and thus the local network dialing codes and the population data relating to population or non-population (unpopulated) of regions are entered in a geographic grid map in the form of a multi-column file etc. in which the following information is deposited for each point (=pixel) with constant or different pixel diameter:

is this point (=pixel) populated or unpopulated in which dialing code area (VW1 to VW9 etc. in FIG. 6) is the point located, in which community (G12 to G3 in FIG. 6) is the point located.

Following this, all dialing codes which are valid at any pixel within the community are determined for each community (G1, G2, G3 in FIG. 6). Furthermore the sum of the populated and of the unpopulated pixels is deposited as a number (alternatively as a percentage for this dialing code sub-area of this community) for each dialing code area of a community (i.e. the part of a dialing code area VW1 which is located in community G1 etc.).

Figure 7:
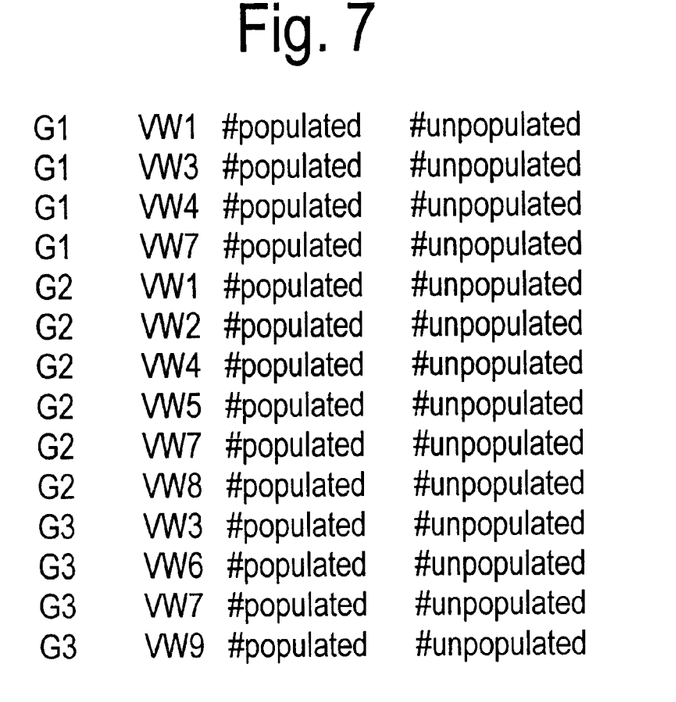
FIG. 7 shows a table of communities, dialing codes and population data.
Figure 8:
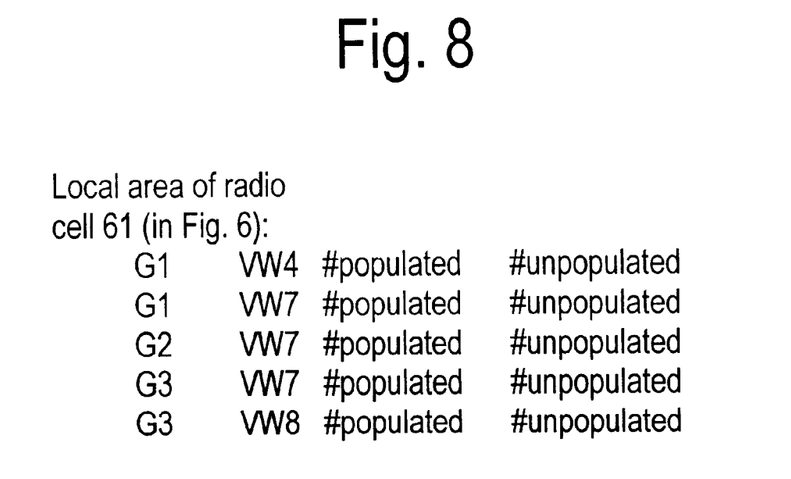
FIG. 8 shows a table of local call dialing codes of an exemplary radio cell.

FIG. 7 shows a table which could be selected for the exemplary section of a mobile radio network according to FIG. 6. In this table, the communities G1 to G3 are listed in the first vertical column, dialing codes (VW1 to VW9) in a second column, inasmuch as they exist for the respective community (G1 to G3), and in each case the number of populated pixels and unpopulated pixels in this dialing code area (e.g. VW1) of this community (e.g. G1).

For example, the number of populated and unpopulated pixels is deposited in the first line in FIG. 7 for the community 1 and its sub-area to which the dialing code VW1 applies. The second line in FIG. 7 again contains, for the part of the community 1 to which dialing code VW3 (e.g. 0211 etc.) applies, the number of populated and unpopulated pixels contained therein (i.e. contained in G1 and VW3). For the community G1, the dialing code sub-areas VW1, VW3, VW4, VW7 are stored since only these dialing code areas at least partially overlap the community area G1 according to FIG. 6. For the community G2, dialing code areas VW1, VW2, VW4, VW5, VW7, VW8 are deposited. For the community G3, dialing code areas VW3, VW6, VW7, VW9 are in each case deposited with population data.

In a further step (which is to take place before, after or in parallel with the previous step), the geographic areas which are in each case covered by a radio cell are determined for the cell areas (for example cell area 61 in FIG. 6 for a particular radio cell) of the radio cells (suitably for all radio cells). For example, the areas can be calculated in approximation on the basis of the Voronoi neighborhood of a base station. The Voronoi neighborhood of a base station includes all points closer to that base station than any other base station. Within the Voronoi neighborhood of a base station, the distribution of the radio cells can be done via the line bisecting the angle of the main direction of radiation of the radio cells (for example in the cell area boundaries between adjacent cells in each case as center of the main directions of radiation of these adjacent cells). This results, for example, in a cell area 61 of a radio cell according to reference symbol 61 in FIG. 6.

For the cell areas determined in this manner (or alternatively in another way) of the radio cells of the mobile radio network, the number of populated and unpopulated pixels existing in the radio cell is now determined in each case for a radio cell area by adding all populated and all unpopulated pixels within the geographic delimiting area of the radio cell. These radio cell data relating to the population of individual radio cells can be used for further differentiating the local area. For example, the table according to FIG. 8 would be obtained for the radio cell having a triangular shape and the reference symbol 61 in FIG. 6. Differentiation can be imagined, for example, to the extent that the dialing code area which can be dialed from a radio cell is also made dependent on the population information with respect to this radio cell according to FIG. 8.

In the next step, the dialing codes are combined to form dialing code clusters. For example, the dialing codes, the leading four digits of which are identical (e.g. 0210, 02102, 02103 etc.), can be combined. In this connection, dialing codes with a four-digit, five-digit or more than five-digit length can be combined for a cluster of dialing codes.

In the example in FIG. 6, the geographic boundaries of three dialing code clusters A, B, C (reference symbols 74, 75, 76) are shown (by thick lines).

In the next step, the dialing code clusters are allocated to the radio cells of the mobile radio network. For this purpose, for example, all dialing code clusters which are within a community which is intersected (i.e. at least partially covered) by the cell area (61) of this respective radio cell are allocated to each cell of the mobile radio network. Thus, it is possible to telephone from a cell, at local rate as a local call, to those subscribers (line network subscribers) who are located in a dialing code area which is located in one of the dialing code clusters which is allocated to the respective radio cell (from which the subscriber wishes to telephone at local rate). In the present example, the subscriber who is registered in a radio cell with the cell area 61 in FIG. 6 could telephone in this manner within the dialing code clusters A, B, C. It is also possible to use, during the allocation of dialing code clusters to in each case one radio cell, only those dialing code clusters within which communities are located whose intersection with the respective radio cell exceeds a threshold value. In this manner, for example, the dialing code cluster area C (reference symbol 76) in FIG. 6 could also be deleted from the list of the dialing code cluster areas with local rate. It is also possible to take into consideration only dialing codes for a dialing code cluster the proportion of populated areas of which exceeds a predeterminable threshold value.

The information for which dialing codes a local call is currently possible (that is to say at local rate), can be sent to all registered mobile stations within the cell area of a mobile radio cell, for example by cell broadcast short message (CB-SMS). This is possible, for example, in GSM or other mobile radio networks; in other mobile radio networks, it may be possible to use other broadcasting possibilities. The information on the area to which a local call is possible is thus radiated in a cell to all subscribers located there. The radiation of the CB-SMS or other broadcast message can be carried out with parameters which initiate an intermediate indication on the display. For this purpose, a data sequence in a data record can be used, for example, which initiates an output on the display such as, for example, instructions to the MMI (men-machine interface) of a mobile radio card. It is also possible to address a SIM application tool kit of a SIM card.

In particular, a data record in the TDPU frame of a CB-SMS sent for this purpose could be used which initiates the representation on a display.

Figure 9:
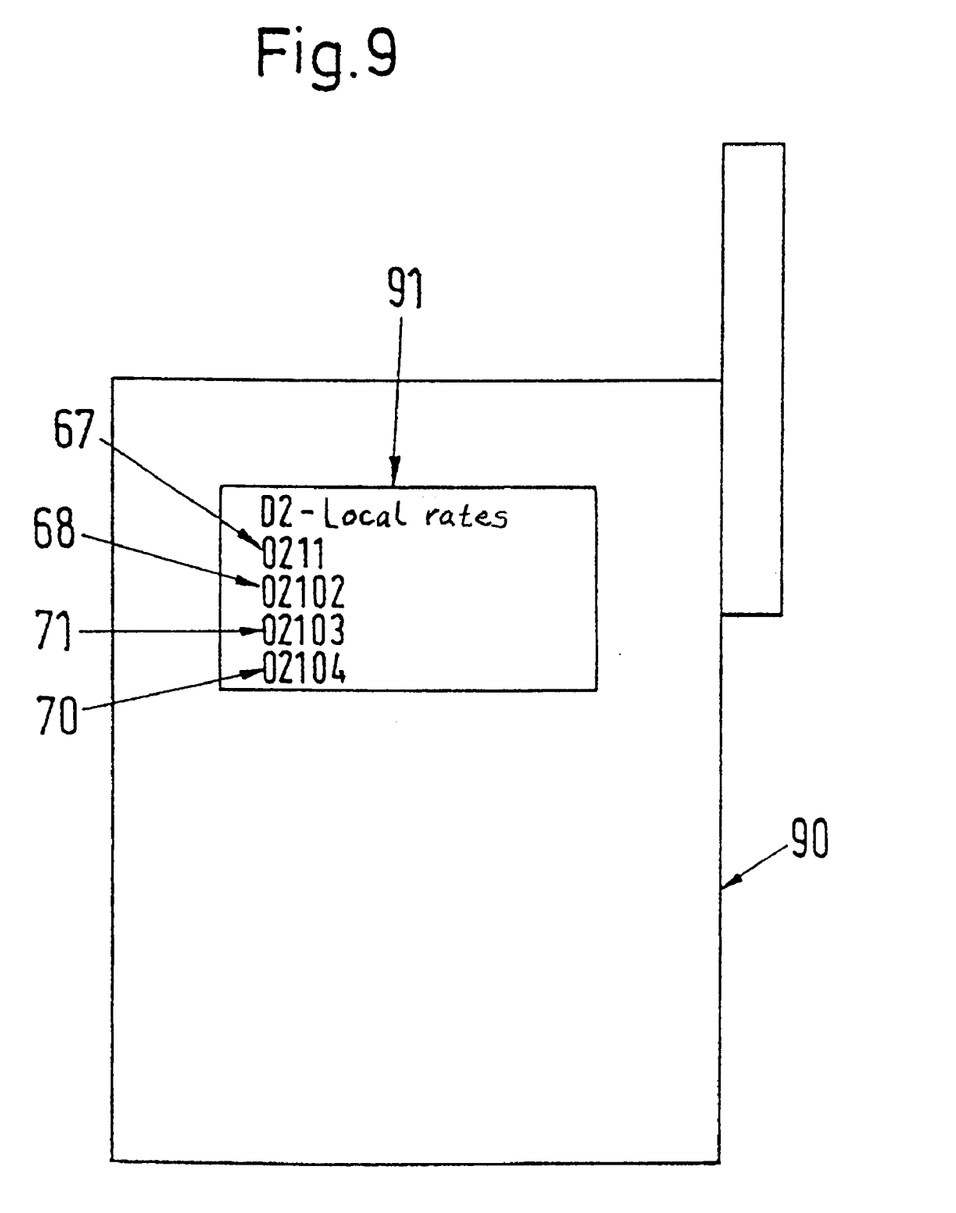
FIG. 9 shows a possible display of local call dialing codes on a mobile radio telephone.

According to FIG. 9, the information can be shown in accordance with FIG. 9 on the display in a mobile radio telephone (=SM) due to a CB-SMS received there on the display 91 of the mobile radio telephone. On the display 91 shown in FIG. 9, the text "D2 local tariff:/0211/02102/ 02103" is shown. This entire text to be represented on the display can be contained, for example, as text sequence in a CB-SMS in addition to an instruction to show this text sequence on the display.

The order in which the dialing codes are shown on the display (91 in FIG. 9), to which telephoning is possible as local call in the currently occupied radio cell (61) of the mobile radio telephone (90), can be, for example, in an order which takes into consideration the sum of populated pixels for each dialing code (i.e. the sum of populated pixels for 0211, for 02102, for 02103 in FIG. 9). In this manner, large cities are represented before smaller cities before villages with regard to the order.

Charges are calculated in the mobile radio network (for example in an MSC, from which the charges for individual calls are in each case forwarded to a central station for accumulation with respect to individual subscribers) in such a manner that local call charges are calculated for local calls and the charges otherwise applying in each case are calculated for other calls. Thus, a decision unit is provided for this purpose in the mobile radio network (for example in the HLR or VLR or MSCs or BSCs), which unit decides whether a local rate is to be calculated for a call made by a subscriber or a usual other rate is to be calculated. For this decision, the dialing code (e.g. 0211) used in the call just made and to be calculated is checked by this decision unit as to whether a local call is possible for this dialing code from the current radio cell of the subscriber during this call. For this purpose, this decision unit accesses a file with dialing codes making local calls possible from this radio cell. This file can be located in each charging station (e.g. MSC, BSC or centrally for subscriber-accumulating stations in the mobile radio network) and interrogated there.

Thus, while there have been shown and described and pointed out fundamental novel features of the present invention as applied to a preferred embodiment thereof, it will be understood that various omissions and substitutions and changes in the form and details of the devices illustrated, and in their operation, may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature.

It is the intention, therefore, to be limited only as indicated by the scope of the claims appended hereto.

What is claimed is:

1. A method for detecting, at a telecommunication network end, complexity, at the telecommunication network end, with respect to a desired or existing telecommunication connection between two subscribers for purposes of charging, one of the subscribers is a mobile radio subscriber with a mobile radio telephone and another of the subscribers is a line network subscriber with a line network connection, the method comprising the steps of:

detecting position of the mobile radio subscriber;

detecting a local call when a telecommunication connection of the mobile radio subscriber to the line network subscriber is present, whose line network connection, due to a line network connection dialing code, is located within a predeterminable local area surrounding the position of the mobile radio subscriber;

detecting a long-distance call when a telecommunication connection of the mobile radio subscriber to the line network subscriber is present, whose line network connection, due to a line network connection dialing code, is located outside the predeterminable local area surrounding the position of the mobile radio subscriber; and for each dialing code area to which a mobile radio subscriber can telephone at local rate, adding all populated pixel raster points of all communities which can be reached by the dialing code and sending the dialing codes, sorted in accordance with a sum of their populated pixels, to a terminal of a mobile radio telecommunications subscriber to be represented there in this order.

2. A method as defined in claim 1, wherein the mobile radio subscriber is a caller and the line network subscriber is a called party.

3. A method as defined in claim 2, further including informing the caller as to the detection of at least one of a long-distance call and a local call.

4. A method as defined in claim 3, wherein the informing step includes connecting the caller to a voice announcement system which announces information representing the type of call (long-distance call/local call) in voice form.

5. A method as defined in claim 3, wherein the informing step includes sending information representing the type of the call by a short message system as one of short message and USSD to the caller.

6. A method as defined in claim 1, including detecting whether the line network dialing code is situated in the local call area or in the long-distance call area with respect to the detected current position of the mobile radio subscriber based on a table of mobile radio subscriber position areas and associated line network dialing codes.

7. A method as defined in claim 6, including storing the mobile radio subscriber position areas in the table in the form of mobile radio network elements in each case covering a mobile radio subscriber position area, the position areas being one of mobile radio base stations and radio cells.

8. A method as defined in claim 7, wherein the mobile radio subscriber position areas are formed based on polygonal areas, in which, at least in approximation, sides of a polygon are in each case a center perpendicular on a connecting line between the radio base station of the position area and the radio base station of an adjacent position area.

9. A method as defined in claim 8, wherein the sides of the polygon are displaced with respect to the center perpendicular due to a main beam direction of a transmitter of the polygonal radio cell.

10. A method as defined in claim 7, wherein local area dialing codes belonging to one of a base station, its polygonal area, and a radio cell are defined based on their dialing code numbers in the table.

11. A method as defined in claim 1, including defining, in each case, a dialing code area as contained in the local area around the current position of the mobile radio subscriber if the dialing code area is located in a community into which community transmission takes place receivably at least in some areas from a radio cell used by the mobile radio subscriber.

12. A method as defined in claim 11, wherein a dialing code area is only defined as belonging to the local area if an area of overlap of the dialing code area with a community into which the radio cell used by the mobile radio subscriber is transmitting is above a threshold value.

13. A method as defined in claim 1, including sending one of a cell broadcast or other broadcast message information on the dialing codes to which local calls are possible to all subscribers within at least one radio cell.

14. A method for detecting, at a telecommunication network end, complexity, at the telecommunication network end, with respect to a desired or existing telecommunication connection between two subscribers for purposes of charging, one of the subscribers is a mobile radio subscriber with a mobile radio telephone and another of the subscribers is a line network subscriber with a line network connection, the method comprising the steps of:
  detecting position of the mobile radio subscriber;
  detecting a local call when a telecommunication connection of the mobile radio subscriber to the line network subscriber is present, whose line network connection, due to a line network connection dialing code, is located within a predeterminable local area surrounding the position of the mobile radio subscriber; and
  detecting a long-distance call when a telecommunication connection of the mobile radio subscriber to the line network subscriber is present, whose line network connection, due to a line network connection dialing code, is located outside the predeterminable local area surrounding the position of the mobile radio subscriber, wherein the steps of detecting a local call and detecting a long-distance call with respect to the detected current position of the mobile radio subscriber include using a table of mobile radio subscriber position areas and associated line network dialing codes, and include only taking into consideration those dialing codes in a coverage area of which there is an adequate population for a possible mobile telephone position area.

15. A method as defined in claim 14, including, for each dialing code area to which a mobile radio subscriber can telephone at local rate, adding all populated pixel raster points of all communities which can be reached by the dialing code and sending the dialing codes, sorted in accordance with a sum of their populated pixels, to a terminal of a mobile radio telecommunications subscriber to be represented there in this order.

16. A method for detecting, at a telecommunication network end, complexity, at the telecommunication network end, with respect to a desired or existing telecommunication connection between two subscribers for purposes of charging, one of the subscribers is a mobile radio subscriber with a mobile radio telephone and another of the subscribers is a line network subscriber with a line network connection, the method comprising the steps of:
  detecting position of the mobile radio subscriber;
  detecting a local call when a telecommunication connection of the mobile radio subscriber to the line network subscriber is present, whose line network connection, due to a line network connection dialing code, is located within a predeterminable local area surrounding the position of the mobile radio subscriber;
  detecting a long-distance call when a telecommunication connection of the mobile radio subscriber to the line network subscriber is present, whose line network connection, due to a line network connection dialing code, is located outside the predeterminable local area surrounding the position of the mobile radio subscriber; and
  defining, in each case, a dialing code area as contained in the local area around the current position of the mobile radio subscriber if the dialing code area is located in a community into which community transmission takes place receivably at least in some areas from a radio cell used by the mobile radio subscriber, wherein a dialing code area is only defined as belonging to the local area if an area of overlap of the dialing code area with a community into which the radio cell used by the mobile radio subscriber is transmitting is above a threshold value, and wherein a dialing code area is only defined as belonging to the local area if a proportion of populated areas of the dialing code area is above a predeterminable threshold value.

17. A method for detecting, at a telecommunication network end, complexity, at the telecommunication network end, with respect to a desired or existing telecommunication connection between two subscribers for purposes of charging, one of the subscribers is a mobile radio subscriber with a mobile radio telephone and another of the subscribers is a line network subscriber with a line network connection, the method comprising the steps of:
  detecting position of the mobile radio subscriber;
  detecting a local call when a telecommunication connection of the mobile radio subscriber to the line network subscriber is present, whose line network connection, due to a line network connection dialing code, is located within a predeterminable local area surrounding the position of the mobile radio subscriber; and
  detecting a long-distance call when a telecommunication connection of the mobile radio subscriber to the line network subscriber is present, whose line network connection, due to a line network connection dialing code, is located outside the predeterminable local area surrounding the position of the mobile radio subscriber, wherein the steps of detecting a local call and detecting a long-distance call with respect to the detected current position of the mobile radio subscriber include using a table of mobile radio subscriber position areas and associated line network dialing codes; and
  storing the mobile radio subscriber position areas in the table in the form of mobile radio network elements in each case covering a mobile radio subscriber position area, the position areas being one of mobile radio base stations and radio cells
  via a radio cell, in each case calculating a radio cell area into which the radio cell is transmitting in a receivable manner in approximation by determining the base station area in form of a Voronoi neighborhood of the base station allocated to the radio cell and distribution of the base station area to the radio cells of the base station via a line bisecting an angle of a main direction of radiation of radio cells of the base station.

18. A method as defined in claim 17, wherein area boundaries between adjacent radio cells are in each case defined as a center of their lines bisecting the angle of their main directions of radiation.

19. A telecommunication network, comprising:

connections to a mobile radio telecommunication network and to a line network telecommunication network; and detection means for detecting complexity, at a telecommunications network end, with respect to a telecommunication connection between a mobile radio subscriber and a line network subscriber for purposes of charging, the detection means including a subscriber detection device for establishing whether one subscriber is a mobile radio subscriber and whether another subscriber is a line network subscriber, the detection means further including a position detection device for detecting a current position of the mobile radio subscriber, the detection still further including a location area detection device operatively arranged so that in case of a telecommunication connection between a mobile radio subscriber and a line network subscriber, a line network connection of which, due to a line network connection dialing code, is located within a predeterminable local area surrounding the position of the mobile radio subscriber, a local call is detected, whereas, in case of a telecommunication connection with a line network subscriber whose line network connection is located outside the predeterminable local area surrounding the position of the mobile radio subscriber due to the line network connection dialing code, a long-distance call is detected which is expensive compared with the local call, the location area detection device storing a table of mobile radio subscriber position areas and associated line network dialing codes, and includes means for considering only those dialing codes in a coverage area of which there is an adequate population for a possible mobile telephone position area.

20. A telecommunication network as defined in claim 19, and further comprising means for announcing information representing whether the call is a long-distance call or a local call.

21. A telecommunication network as defined in claim 19, wherein the location area detection device is operative to access a table file in which dialing code numbers, which can be dialed in each case as local area, are stored for data one of representing and containing positions.

22. A telecommunication network as defined in claim 21, wherein the data representing positions in each case represent one of at least one base station and at least one radio cell of a mobile radio network.

* * * * *

UNITED STATES PATENT AND TRADEMARK OFFICE
CERTIFICATE OF CORRECTION

PATENT NO. : 6,847,815 B1
DATED : January 25, 2005
INVENTOR(S) : Florian Graf

Page 1 of 1

It is certified that error appears in the above-identified patent and that said Letters Patent is hereby corrected as shown below:

<u>Title page,</u>
Insert the following:
-- [22]  PCT Filed:         May 14, 1999
   [86]  PCT No.:           PCT/DE99/01506
         §371(c)(1),
         (2), (4) Date:     April 30, 2001

[87]  PCT Pub. No.:      WO/00/04700
         PCT Pub. Date:     January 27, 2000 --.

Signed and Sealed this

Fourteenth Day of February, 2006

JON W. DUDAS
*Director of the United States Patent and Trademark Office*